(12) United States Patent
Axmann

(10) Patent No.: US 6,253,910 B1
(45) Date of Patent: Jul. 3, 2001

(54) DEVICE FOR SORTING PIECE GOODS

(75) Inventor: Norbert Axmann, Sinsheim (DE)

(73) Assignee: Axmann Fördertechnik GmbH, Sinsheim-Steinsfurt (DE)

( * ) Notice: Subject to any disclaimer, the term of this patent is extended or adjusted under 35 U.S.C. 154(b) by 0 days.

(21) Appl. No.: 09/584,804

(22) Filed: May 31, 2000

(30) Foreign Application Priority Data

Jun. 2, 1999 (DE) ............................... 199 25 294
Mar. 17, 2000 (DE) ............................... 100 13 332

(51) Int. Cl.[7] ................................... B65G 23/04
(52) U.S. Cl. ..................... 198/835; 198/370.06; 209/509
(58) Field of Search .................... 198/643, 780, 198/781.04, 793, 804, 370.06, 835; 209/509

(56) References Cited

FOREIGN PATENT DOCUMENTS 42 44 170    10/1995 (DE) .

*Primary Examiner*—Donald P. Walsh
*Assistant Examiner*—Mark J. Beauchaine

(74) *Attorney, Agent, or Firm*—Collard & Roe, P.C.

(57) ABSTRACT

Sorting devices are successively guided along a sorting line and driven by means of a conveyor system. Each sorting device has a running carriage with running rollers guided in the sorting line's guide rails. In addition, the sorting device contains a means for receiving and ejecting individual parceled articles sent from a loading station. The conveyor system comprises a chain having chain links with flat undersides which are movably connected to each other. The chain links are rigidly connected to each running carriage of the sorting devices and project beyond these sorting devices in a transport direction. The joints between successive chain links are each bridged on their underside by a pre-tensioned leaf spring. The driving means is a friction wheel drive with a friction wheel engaging the chain links on their undersides. In an alternative embodiment of the invention, one chain link is rigidly connected to each of the running carriages of the sorting devices. Here, the conveyor system comprises a friction surface drive with at least three rotating elements each having a contact pressure-applying periphery that revolves about rotation axles. The rotation axles are connected with a rigid carrier and are spaced apart from each other along the sorting line so that the contact pressure-applying periphery of at least two of the rotating elements always non-positively cooperates with the contact pressure-receiving surface of at least one chain link.

24 Claims, 6 Drawing Sheets

DEVICE FOR SORTING PIECE GOODS

BACKGROUND OF THE INVENTION

1. Field of the Invention

The invention relates to a device for sorting piece goods. These sorting devices are successively guided along a sorting line and driven by means of a conveying system. Each sorting device has a running carriage with running rollers guided in guide rails on the sorting line. In addition, there is a means for receiving an individual parceled article charged in a loading station, and for ejecting this parceled article at a defined location of an ejection station.

2. The Prior Art

Devices for sorting parceled goods with a conveyor system are generally known in the art. The conveyors using these sorting devices are loop drives with curved chains, guided via reversing wheels, with the sorting devices being connected to these chains, and also having linear drives. To eject the parceled goods, the sorting devices are equipped either with tipping trays or with belt conveyors driven transversely in relation to the sorting line.

The two known driving systems are expensive. Therefore, the present invention provides a device that is simpler in design, and less expensive for the purpose specified above.

SUMMARY OF THE INVENTION

In the first embodiment of the invention, the conveyor system comprises a link chain consisting of chain links that are connected to each other in an articulated way. These chain links have flat undersides and are each solidly connected on an underside of the running carriage of the sorting devices via a chain link projecting beyond these sorting devices in the direction of conveyance. The joints between chain links following each other are each bridged by an initially tensioned leaf spring. In this case, the conveyor system has a friction wheel drive with a friction wheel engaging the chain links on their undersides.

The purpose of the first embodiment of the invention is that the running carriages of the sorting devices are equipped on their undersides with chain links, so that these chain links form friction strips passing through the sorting line in the longitudinal direction. These friction strips are connected to each other in an articulated manner so that the friction wheels of the friction wheel drives cooperate with these friction strips. The joints between chain links following one another are bridged on the underside by initially tensioned leaf springs. These leaf springs rest against the chain links, so that the friction wheel can engage largely flat surfaces also in the zone of these joints.

In another embodiment of the invention, the individual chain links are coupled to each other via ball joints, by means of special connecting elements. These special connecting elements are connected to the top sides of the chain links adjacent to one another, bridging the joints between these chain links.

The leaf springs for bridging the joints between chain links are each secured on a chain link near the end surface of this chain link pointing at the other chain link. These chain links flatly abut the underside of the other chain link, bridging the joint with an initial tension. Thus, a smooth frictional surface is provided, extending all the way through to engage the friction wheel in the zone of the joints.

In another embodiment of the invention, the friction wheel drive is designed as a proportional drive with a friction wheel. The force that presses the friction wheel against the chain links changes depending on the driving force that is transmitted to the link chain. Therefore, the given operating requirements are met and, furthermore, there is a slip-free driving of the link chain and thus, of the sorting devices to the greatest possible extent.

This proportional drive is known from the prior art and described in DE 42 44 170 C2. Furthermore, it has been found that it is also useful if the friction wheel drive is arranged within the device so that the friction wheel engages the flexibly jointed chain links on their undersides in a horizontally extending section of the sorting line.

Furthermore, there are at least two friction wheel drives can be arranged along the sorting line with a spacing between the two friction wheel drives. In this case, each of the latter comprises one friction wheel that cooperates with the chain links by friction grip. This design is recommended particularly for very long sorting lines and/or sorting lines extending at different levels.

With the device designed according to the above requirements, the joints between successive chain links are each bridged on the underside by an initially tensioned leaf spring. In addition, the device has a drive system with a simple structure. Thus, this design also provides a comparatively low-noise driving operation. However, a driving system with even less development of noise and also greater flexibility with respect to the arrangement of the driving system is deemed desirable for certain applications.

In an alternative embodiment of the invention, the conveyor system comprises a link chain consisting of chain links connected to each other in an articulated manner. In this case, one chain link is solidly connected with the running carriages of the sorting devices. Here, the conveyor system has a frictional surface drive with at least-three rotating developments, each having a contact pressure applied along the periphery and revolving about axis of rotation. These rotating elements are connected with a rigid carrier, spaced apart from each other in the direction of the sorting line. In this way, the contact pressure applied along the periphery of at least two of the rotating elements always cooperates non-positively with the contact pressure receiving surface of the single chain link. In all of these cases, the sorting devices are effectively guided along a sorting line, and driven by means of a conveyor system. Each sorting device has a running carriage with running rollers guided on the guide tracks of the sorting line, as well as a means for receiving an individual parceled article loaded in a charging station. In addition, there is a means for ejecting such a parceled article at a defined location of an ejection station.

The invention is designed to achieve a low noise driving operation using a simple structure. Here, the elements are connected to a rigid carrier and arranged on the carrier, spaced apart from that carrier along the sorting line in the direction of conveyance. In addition, at least two of these rotating elements always cooperate non-positively with at least one chain link. The result of this structure is that the contact pressure-applying periphery of each third or further rotating element engages the intermediate spaces located on the joints between two successive chain links with at least less force than when rolling off along the chain links. This results in a low-noise driving operation.

Furthermore, this driving system has greater flexibility with respect to the arrangement and design of the chain links and the arrangement of the parts and devices associated with the friction surface drive. Thus, the sorting device and the driving system can be easily customized to given user requirements.

There are at least three rotating elements spaced apart from each other in the direction of the sorting line so that the contact pressure-applying periphery of each of the rotating elements can cooperate non-positively with one of the successive chain links. The development of noise of the driving system can thus be reduced even further.

Moreover, rotating elements should be designed in the form of friction wheels whose contact pressure-applying peripheries directly cooperate by a frictional grip with the contact pressure-receiving surfaces of the chain links. Alternatively, there should be a loop drive, preferably in the form of a belt, arranged between the contact pressure-applying periphery of the rotating elements and the contact pressure-receiving surface of a chain link. This belt loops around at least two rotating elements, so that the loop drive cooperates non-positively with the contact pressure periphery of the rotating elements, and cooperates by a frictional grip with the contact pressure-receiving surface of the chain link. Thus, this design results in less noise in the system as well.

The loop drive is looped around at least three of the rotating elements spaced apart from each other in the direction of the sorting line.

The development of noise can be further reduced if the loop drive cooperates by a frictional grip with the contact pressure-applying periphery of the rotating elements that are preferably designed in the form of friction wheels. The rotating elements are coupled via a driving means so that their contact pressure-applying peripheries rotate substantially with the same peripheral speed. Favorable driving conditions can be created with this design, and the friction surface drive can be driven with a single driving aggregate, such as a motor.

The driving means is designed in the form of a loop drive in the form of a wedged and/or toothed belt. This drive is arranged on belt pulleys rotating around axis of rotation, whereby one rotating element and at least one belt pulley are, preferably arranged in each case for rotation about a common fixed axle of rotation.

Furthermore, it is advantageous if, in a horizontally extending section of the sorting line, the contact pressure-applying periphery of the rotating elements engages the articulated chain links on the underside or on the side. Favorable driving conditions can be created in this way, with advantageous possibilities for arranging the friction surface drive.

In addition, the chain links should be designed in the form of friction strips that are solidly connected with the undersides of the running carriages of the sorting devices. In this case, these friction strips are preferably provided with parallel contact pressure-receiving surfaces pointing away from each other. Thus, the one contact pressure-receiving surface cooperates non-positively with the contact pressure-applying periphery of the rotating elements. In addition, the other contact pressure-receiving surface cooperates non-positively with a counter pressure roller that is fixed on the device. This permits favorable arrangement conditions, a stable and precise guidance, as well as a low-noise driving operation.

If the chain links project in the direction of the sorting line, preferably on both sides of the running carriages of the sorting devices, this minimizes the intermediate spaces forming at the joints of the chain links and noise within the driving system. Furthermore, these measures permit narrow curves of the sorting line in connection with sorting devices with a relatively great width perpendicular to the direction of conveyance without having to offset the sorting devices vertically in relation to each other.

The carrier of the axis of rotation is preferably movable in relation to the plane contact pressure-receiving surfaces of the chain links. This structure permits particularly favorable driving conditions and reduced noise levels of the driving system.

The friction surface drive should be a proportional drive with at least one rotating element whose force of pressure applied to the chain links changes depending on the driving force to be transmitted to the link chain. This design permits adaptation to the given load conditions and operational requirements, and slip-free driving of the link chain to the greatest possible extent, and adjustment to the sorting devices as well.

Furthermore, there are at least two friction surface drives spaced apart from one another along the sorting line. These friction surface drives have at least three rotating elements having a contact pressure-applying periphery and non-positively cooperating with the chain links. This design permits a simple and low-noise drive in connection with very long sorting lines and/or sorting lines operated at different levels.

The connected chain links are articulated on each other, so that there are intermediate spaces logically forming joints. According to the first embodiment of the invention, these intermediate spaces are bridged on the underside of the link chain by the aforementioned leaf springs. It is advantageous to equip the chain links with spherical roundings at their end surfaces. This is to keep these intermediate spaces as small as possible, while permitting the individual chain links to be flexible in relation to each other. In this way, the link chain can follow curves and can also be guided through ascending or descending sections of the sorting line.

Instead of providing the end surfaces with spherical roundings, it is also possible to provide the chain links at their face ends with beveled sections. In that way, an upwardly pointing recess having a V-shaped angle is formed between each two jointed chain links that permits the connected chain links to move free of constraint particularly when traveling through ascending and descending sections of the sorting line. Moreover, the chain links, can be rounded off at their top face ends, by providing them with semi-circular shaped ends, or with chamfered ends in the form of arrow points to curve the link chain.

The measures specified above both individually and in combination contribute to the formation of a device that is a low-noise driving system with a simple structure.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only, and not as a definition of the limits of the invention.

In the drawings, wherein similar reference characters denote similar elements throughout the several views.

DETAILED DESCRIPTION OF PREFERRED EMBODIMENTS

Figure 1:
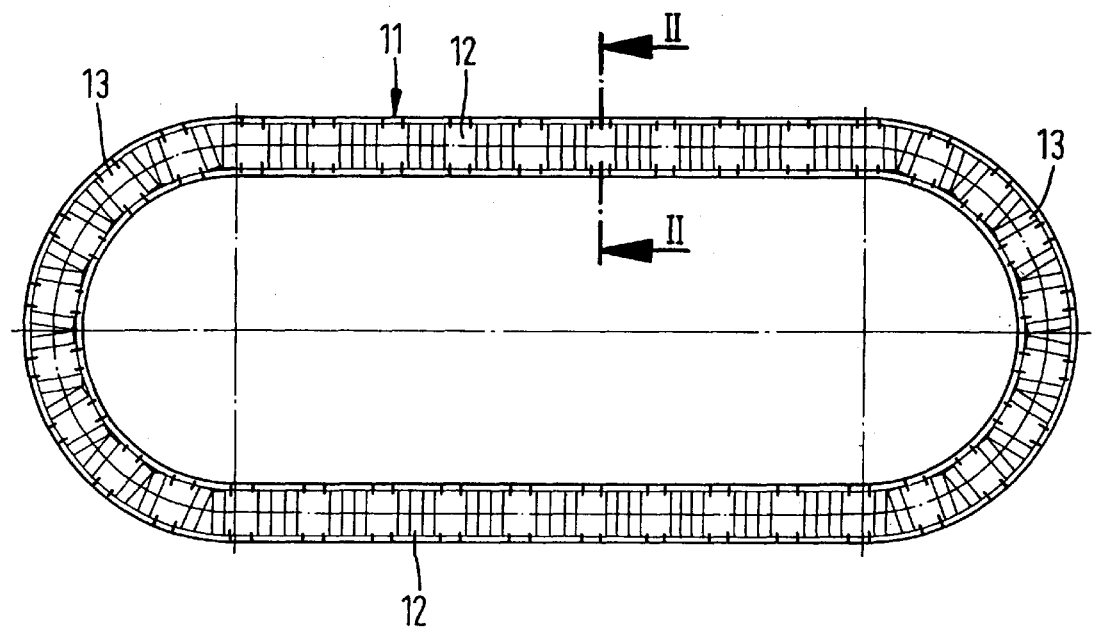
FIG. 1 is a top view of a device for sorting piece goods with a self-contained sorting line extending in a horizontal plane, with two straight sections and two semi-circular, curved sections connecting the two straight sections.
Figure 2:
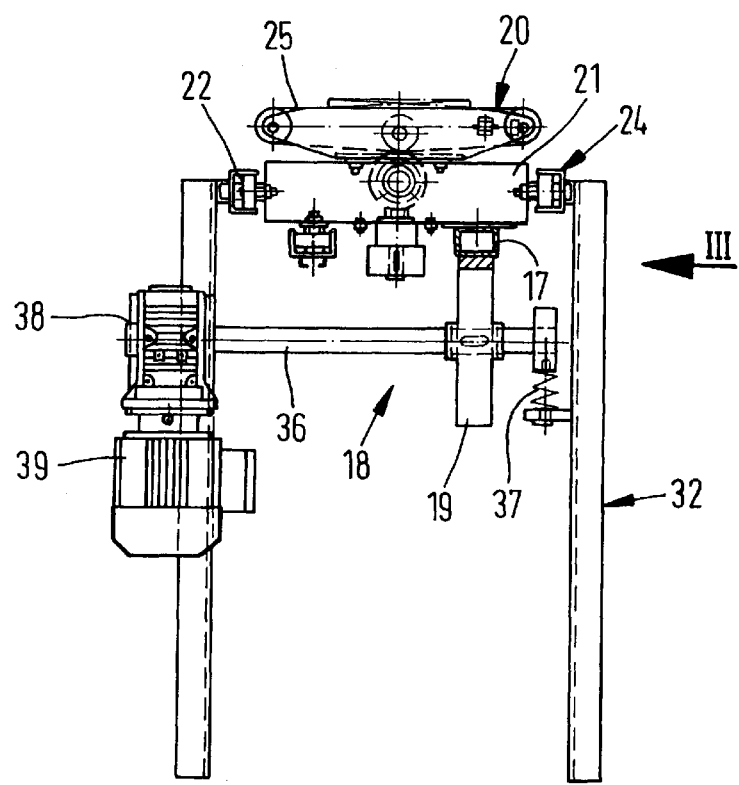
FIG. 2 is a cross sectional view taken through section II—II of FIG. 1.
Figure 3:
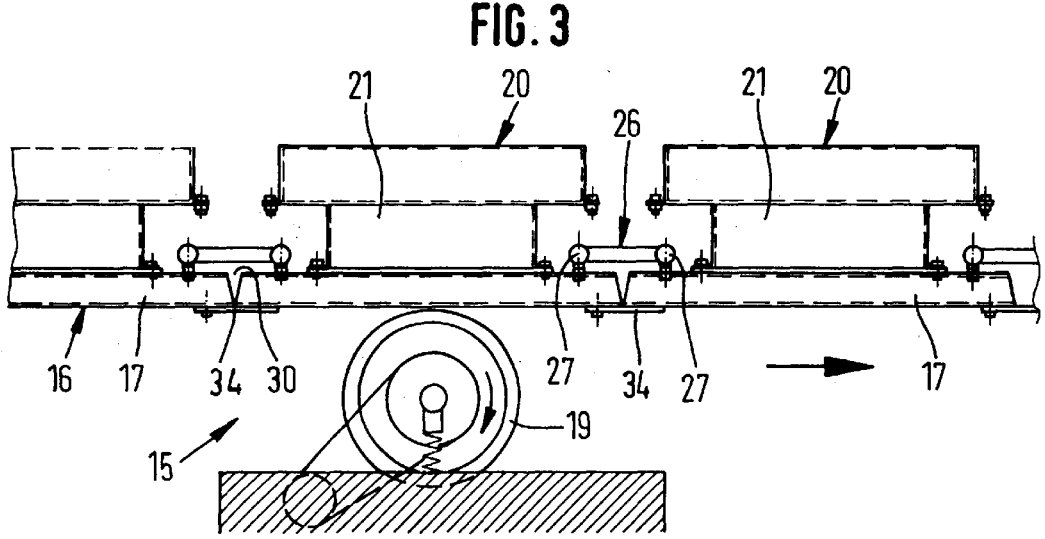
FIG. 3 is a view according to arrow III in FIG. 2, showing sorting devices, which are flexibly coupled to each other by means of a link chain, and a friction wheel drive with a friction wheel engaging the links of the chain on their undersides.

Referring to FIGS. 1 to 3, there is shown a device for sorting piece goods having a self-contained sorting line 11, which extends along a horizontal plane and has two straight-line sorting sections 12. In addition, there are two curved sorting sections 13 connecting the two straight-line sections. There is also at least one charging station and a plurality of successively located ejection stations with lateral ejection chutes arranged along sorting line 11. The charging station, the ejection stations and the ejection chutes are not shown in the drawing.

Furthermore, the invention includes a conveyor system 15 (FIG. 3) with a link chain 16 consisting of chain links 17, which are flexibly connected to each other. In addition, there is also a friction wheel drive 18 (FIG. 2) with a friction wheel 19 engaging chain links 17 on their undersides. Sorting devices 20, which are movably guided along sorting line 11, are connected to each other by means of link chain 16.

Sorting devices 20 each have a running carriage 21 with two running rollers 22 spaced apart from each other on both sides in the direction of conveyance and guided along rails 24. Guide rails 24 are fixed on the device and laterally spaced apart from each other. A conveyor belt 25, which can be driven transversely in relation to sorting line 11, is disposed on each of the running carriages 21 of sorting devices 20. The conveyor belts 25 of sorting devices 20 are each guided via reversing rollers with axis of rotation extending in the direction of transport. The conveyor belts of the sorting devices are transversely driven by a driving means wherein the ejection stations can be selectively engaged to cooperate.

Sorting devices 20, are movably guided in succession along sorting line 11, and are coupled to each other by a link chain 16 which, in turn consists of chain links 17 which are flexibly connected to one another. Each chain link 17 has a length slightly greater than the width of each sorting device 20 in their direction of transport. This link is fixed under each running carriage 21, pointing in its transport direction, and projects at both ends beyond sorting device 20. The ends of successive chain links 17 are flexibly connected to each other by means of connecting elements 26 with ball joints 27 arranged on the sides of the chain links pointing at belts 25 of sorting devices 20. These components are arranged so that sorting devices 20 can pass through the straight-lined and curved sections 12 and 13 of sorting line 11. In addition, these sorting devices can also be transferred to elevated or lowered sorting sections. Thus, ball joints 27 permit compensation during reversals in the planer line, and also in ascending or descending sections of sorting line 11.

Figure 4:
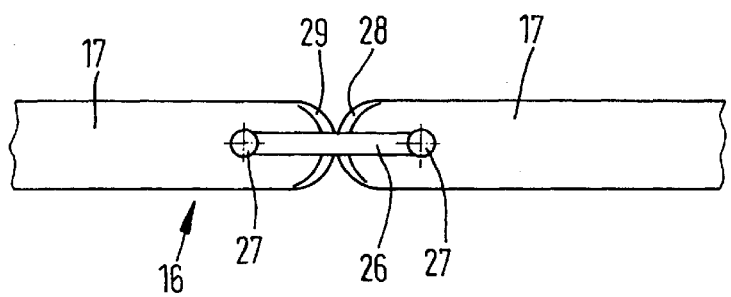
FIG. 4 is a top view of a cutout of two chain links connected with each other in an articulated manner.

To curve the link chain 16, the end surfaces of the chain links contain roundings 28 as shown in the top view of FIG. 4. Thus, because of these roundings 28, the chain links can follow the course of sorting line 11 free of constraint, forming polygonal curved courses.

Figure 5:
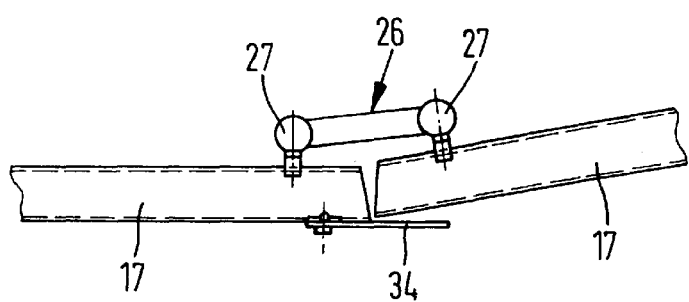
FIG. 5 is a side view of a cutout of two flexibly connected chain links present within the zone of an ascending guidance of the sorting devices.
Figure 6:
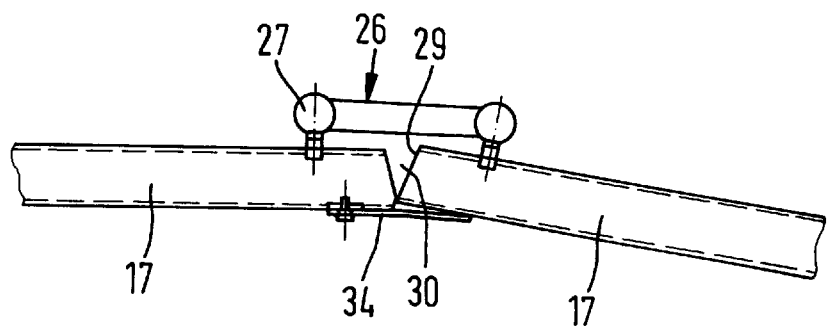
FIG. 6 is a view similar to FIG. 5, showing two flexibly connected chain links present within the zone of a descending guidance of the sorting devices.

Furthermore, the end surfaces of chain links 17 have upwardly recessed, beveled sections 29, which form upwardly open V-shaped gussets within the zone of adjacent chain links 27. This is shown especially in FIG. 3. Because of gussets 30 it is possible for the flexibly connected chain links 17 to flex down against each other without constraint in their zones of connection when sorting devices 20 are transferred to an elevated or lowered section of a sorting line 11. This is shown in detail in FIGS. 5 and 6.

Figure 7:
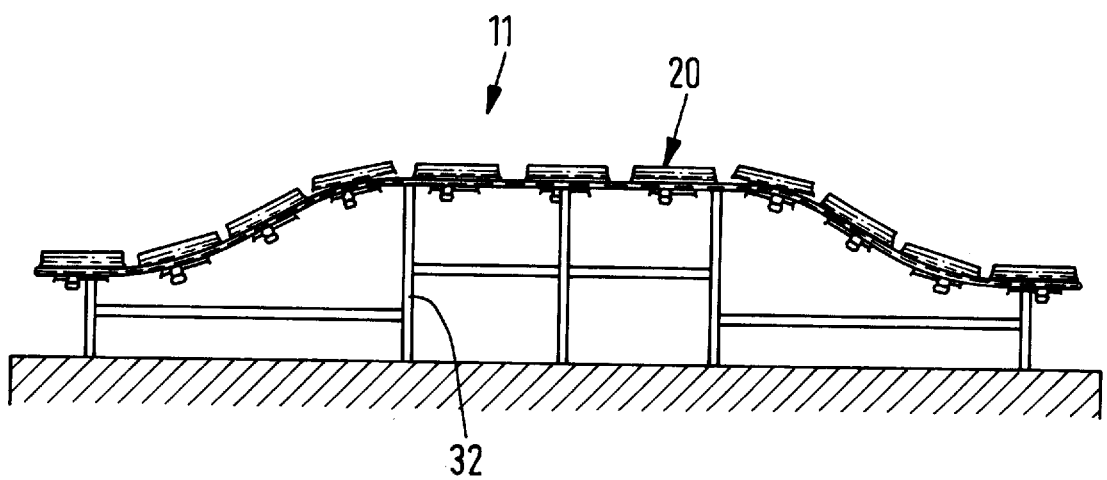
FIG. 7 is a side view of a cutout showing the guidance of coupled sorting devices in different planes.

FIG. 7 is a schematic side view of sorting line 11, disposed on a standing rack 32 that is elevated by sections.

As shown in FIG. 3, chain links 16 are provided with flat undersides and are arranged fixed on the running carriages 21 of the sorting device 20. The friction wheel 19 of the friction wheel drive 18 cooperates with the flat undersides such that small intermediate spaces logically occur between the flexibly interconnected chain links 17. These intermediate spaces can be designed to be very small. However, intermediate spaces that are poorly bridged by the friction wheel 19 are unavoidable in ascending or descending sections of sorting line 11. This occurs where sorting devices 20 are guided accordingly, and are also unavoidable along the curves of sorting line 11. Thus, joints between adjacent chain links 17 are bridged by a leaf spring 34 that is secured on one of the chain links 17 near the joint, and abuts the underside of the next adjacent chain link 17 with initial tension. This construction provides a flat engagement surface for friction wheel 19 along the zone of the joints. Thus, when device 10 is in operation, no shocks are caused. In this way, there is minimization of both noise and wear of the friction wheel.

Friction wheel drive 18 is a proportional drive of the type known from DE 42 44 170 C2. With this drive, friction wheel 19 received with torsional strength on a driving shaft 36, is pressed against the undersides of chain links 17 by means of a pressure spring 37 (FIG. 2). This proportional drive is designed so that the force of the pressure by which friction wheel 19 is forced against chain links 17 changes depending on the driving force that is transmitted to link chain 16. These proportional drives create a largely slip-free drive. Driving shaft 36 receiving friction wheel 19 with a torsional strength, is drive-connected with an electric drive motor 39 via a bevel gear transmission 38. The bevel gear transmission 38 and drive motor 39, which is flange coupled to this gear box, is supported, on a leg of standing rack 32, which also supports guide rails 24 for guiding sorting devices 20.

Figure 8:
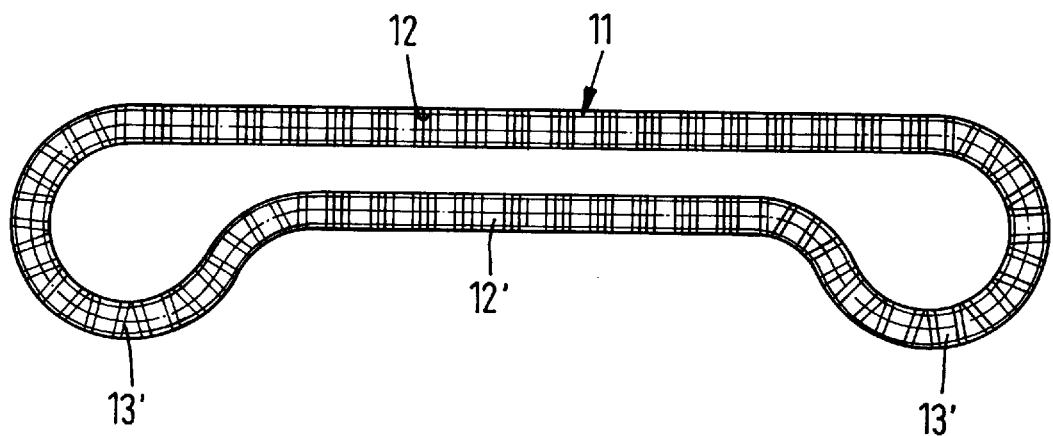
FIG. 8 is a top view of a device for sorting piece goods in a sorting line with a path of the conveyor line deviating from the one shown in FIG. 1.

Sorting line 11, shown in FIG. 8, also has two straight-line sorting sections 12, 12' extending spaced apart from each other, and two curved sorting sections 13' connecting these straight-line sections. However, these curved sections each form approximately a three-quarter circle.

Figure 9:
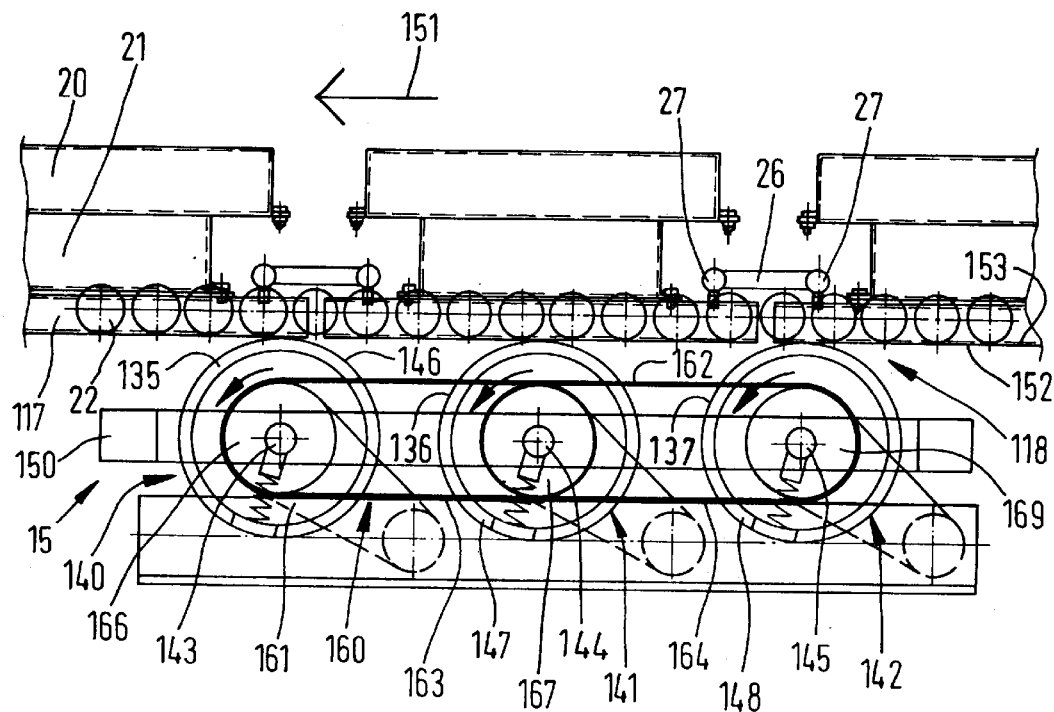
FIG. 9 is a view taken along section IX—IX of FIG. 11, showing another embodiment of sorting devices flexibly coupled to each other by means of a link chain, as well as a friction surface drive with three friction wheels engaging the links of the chain on their undersides.

The friction surface drive 118 shown in FIG. 9 contains three rotating elements 140, 141, 142, which are designed in the form of friction wheels 135, 136, and 137. These friction wheels are rotatably mounted on a rigid carrier 150, revolving around rotation axles 143, 144, and 145, and spaced apart from each other in the direction of conveyance shown by arrow 151. This carrier is movable in relation to the chain links 117. The friction surface drive 118, like friction drive 18 shown in FIG. 2, is a proportional drive of the type known from German Patent DE 42 44 170 C2. In surface drive 118, friction wheels 135, 136, and 137 are received with torsional strength on rotation axles 143, 144, and 145, that are pressed against the undersides of chain links 117 by means of a leaf spring. This proportional drive 118 is designed so that the force by which friction wheels 135, 136, and 137 are pressed against chain links 117 changes depending on the driving force to be transmitted to link chain 16. The rotation axle 144 receives friction wheel 136 with torsional strength, and serves as the driving axle, and is actively drive-connected with an electric drive motor 139 via a bevel gear transmission 138 as shown in FIG. 11.

Friction wheels 135, 136, and 137, on their side surface, have a contact pressure-applying periphery, which non-positively and by a frictional grip, actively cooperates with the contact pressure-receiving surfaces 152 of chain links 117. FIG. 9 shows how friction wheels 135, 136, 137 are connected with the carrier 15. This carrier is movable in relation to chain links 117 - via their rotational axles 143, 144, and 145. These friction wheels 135, 136, and 137 are spaced apart in the direction of the sorting line, or in the direction of conveyance so that the contact pressure-applying periphery of at least two of friction wheels 135, 136, and 137 always cooperate non-positively and by a frictional grip with the contact pressure surface of adjacent chain links 117. Thus, in the position of conveyance shown in FIG. 9, the contact pressure-applying periphery of each of three friction wheels 135, 136, and 137 cooperate in each case non-positively and by a frictional grip with contact pressure-receiving surface 152 of one of successive chain links 117. This special arrangement and design of friction surface drive 118, which is adapted to the length of chain links 117 and the intermediate spaces occurring between their end surfaces, provides a driving system that has low noise.

Figure 11:
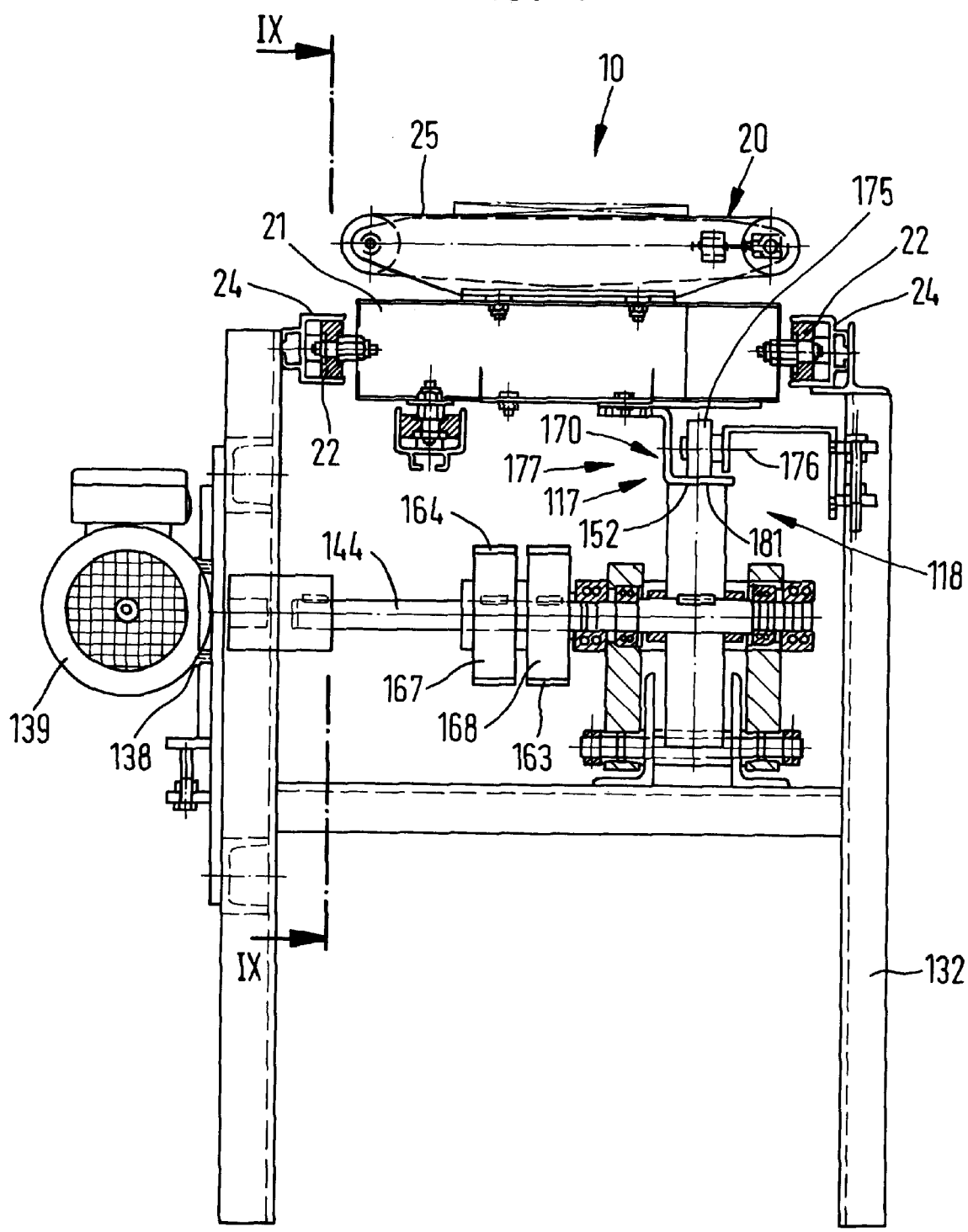
FIG. 11 is a cross section through the device of FIG. 9 similar to the cross section shown in FIG. 2.

FIGS. 9 and 11 show belt pulleys 166, 167, 168, and 169 that are arranged with torsional strength on the rigid rotation axles 143, 144, and 145 of friction wheels 135, 136, and 137. The two belt pulleys 167 and 168 are shown secured on rotation axle 144, offset in parallel in the axial direction. Belt pulleys 166 and 167, and belt pulleys 168 and 169 are each aligned with one another in the direction of conveyance shown by arrow 151. Loop drives 161 and 162 serve as the driving means 160 in the form of the toothed belts 163 and 164, and are arranged on belt pulleys 166 and 167 and on belt pulleys 168 and 169. Frictional surface drive 116 can be driven via one single driving axle such as rotation axle 144 and by means of one single driving aggregate, which is the electric drive motor 139 in the present case. Furthermore, it is possible with this loop drive 161 to revolve the contact pressure-applying peripheries 146, 147, and 148 of the three friction wheels 135, 136, and 137 with substantially the same peripheral speed. This design results in favorable driving conditions combined with low noise.

Figure 10:
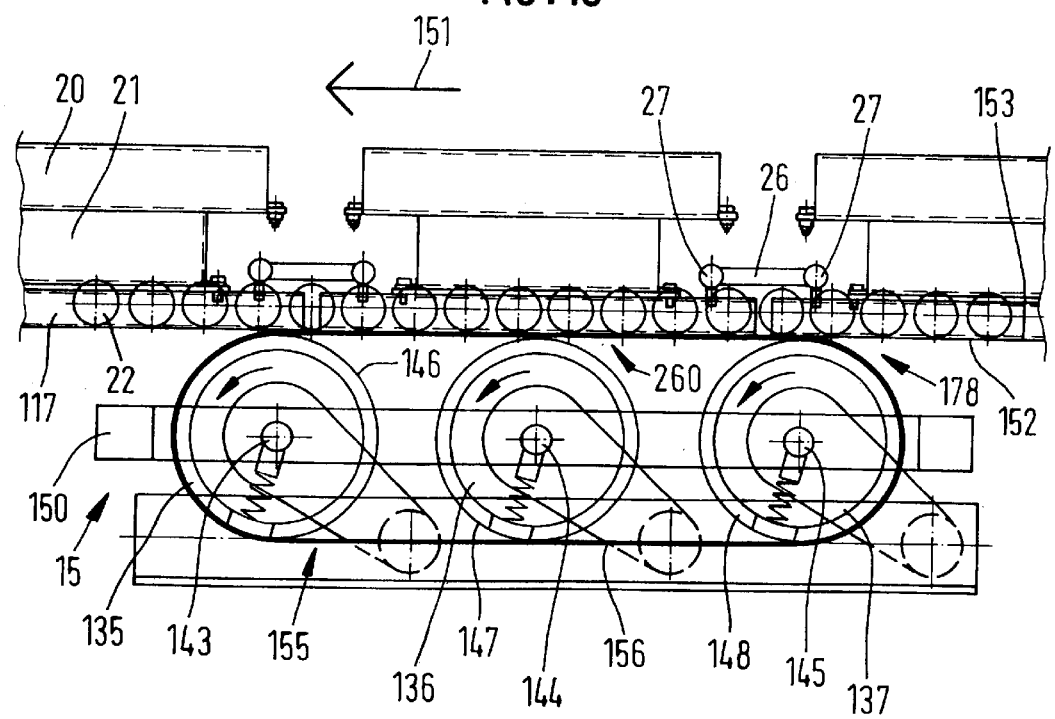
FIG. 10 is a view similar to FIG. 9, showing another embodiment of a friction surface drive with three friction wheels provided with a loop drive, the latter engaging the links of the chain on their undersides.

FIG. 10 shows another favorable embodiment of the invention, whereby three friction wheels 135, 136, and 137 denoted as the rotating elements 140, 141, and 142 are offset one after the other in the direction of conveyance shown by arrow 151. These rotating elements revolve around rotation axles 143, 144, and 145, wherein these rotational axles 143, 144, and 145 are supported and secured on rigid carrier 15. Thus, this rigid carrier is movable relative to chain links 117. However, the embodiment shown in FIG. 10 is different from the one shown in FIG. 9, because the frictional surface drive 178 shown in FIG. 10, is a loop drive 155 in the form of a belt 156. Loop drive 155 is arranged on friction wheels 135, 136, and 137 as a drive common to friction wheels 135, 136, and 137. In the present embodiment shown in FIG. 10, friction wheels 135, 136, and 137 consequently do not directly apply contact pressure via their contact pressure-applying peripheries 146, 147, and 148 to the contact pressure-receiving surfaces 152 of chain links 117. Instead, friction wheels 135, 136, and 137 apply pressure indirectly via belt 156 disposed in between. An even stronger damping of the noise can be achieved, and belt 156 serves at the same time as a driving means 260 providing friction wheels 135, 136, and 137 with substantially the same peripheral speed. Belt 156 also serve as a driving means for the sorting devices 20, having chain links 117. In addition, other rotating elements can be used instead of the friction wheels 135, 136, and 137. These other rotating elements in connection transmit a driving force to loop drive 155 non-positively and by a frictional grip. These other rotating elements have suitable profiles on their periphery that can be positively engaged by mating inner profiles of a loop drive.

In addition, the outer contact pressure-applying periphery of this loop drive can non-positively and by frictional grip cooperate with contact pressure-receiving surfaces 152, and 252 of chain links 117, and 217. Friction wheels 135, 136, and 137 are also driven in the present embodiment via an electric motor 139, which is connected via a bevel gear transmission with the rotation axle 144 of friction wheel 136, this axle being designed as a driving axle.

The cross section of chain links 117 according to FIGS. 9 and 10 is shown in FIG. 11. These figures show that chain links 117 are embodied in the form of a friction strip 170 having the shape of a double-L section. This double-L section has an upper horizontal leg, a vertical leg adjoining the latter, and a lower horizontal leg 181 adjoining this vertical leg. The upper horizontal leg is secured on the underside of the associated running carriage 21, whereas the lower horizontal leg 181 has the parallel contact pressure-receiving surfaces 152 and 153 within the zone of its free end. The lower contact pressure-receiving surface 152 can be engaged non-positively and by friction grip by the contact pressure-applying periphery 146, 147, and 148 of the rotating elements 140, 141, and 142. On the other hand, the upper contact pressure-receiving surface 153 of the horizontal leg 181 of the friction strip 170 can be non-positive, and by a frictional grip engage counter pressure roller 175. Pressure roller 175 is secured on the device fixed on standing rack 132 and may serve to support friction strip 170. Thus, rotation axle 176 of counter pressure roller 175 is arranged parallel with rotation axle 144 of rotating element 141. In this case, the plane containing rotation axle 176 and rotation axle 144 extends approximately perpendicular to contact pressure-receiving surfaces 152 and, respectively, 153, and approximately perpendicular to the direction of transport shown by arrow 151.

In the embodiment shown in FIGS. 9 and 11, rotating elements 140, 141, and 142, via their contact pressure-applying peripheries 146, 147, and 148, engage on the underside the contact pressure-receiving surfaces 152 of friction strips 170 via chain links 117. These chain links 117 are flexibly connected with each other by connecting elements 26 in the form of the ball joints 27. In this way, friction surface drive 118 can be arranged beneath sorting devices 20 guided on the running carriages 21, specifically between the struts of the standing rack 132 forming a frame.

Figure 12:
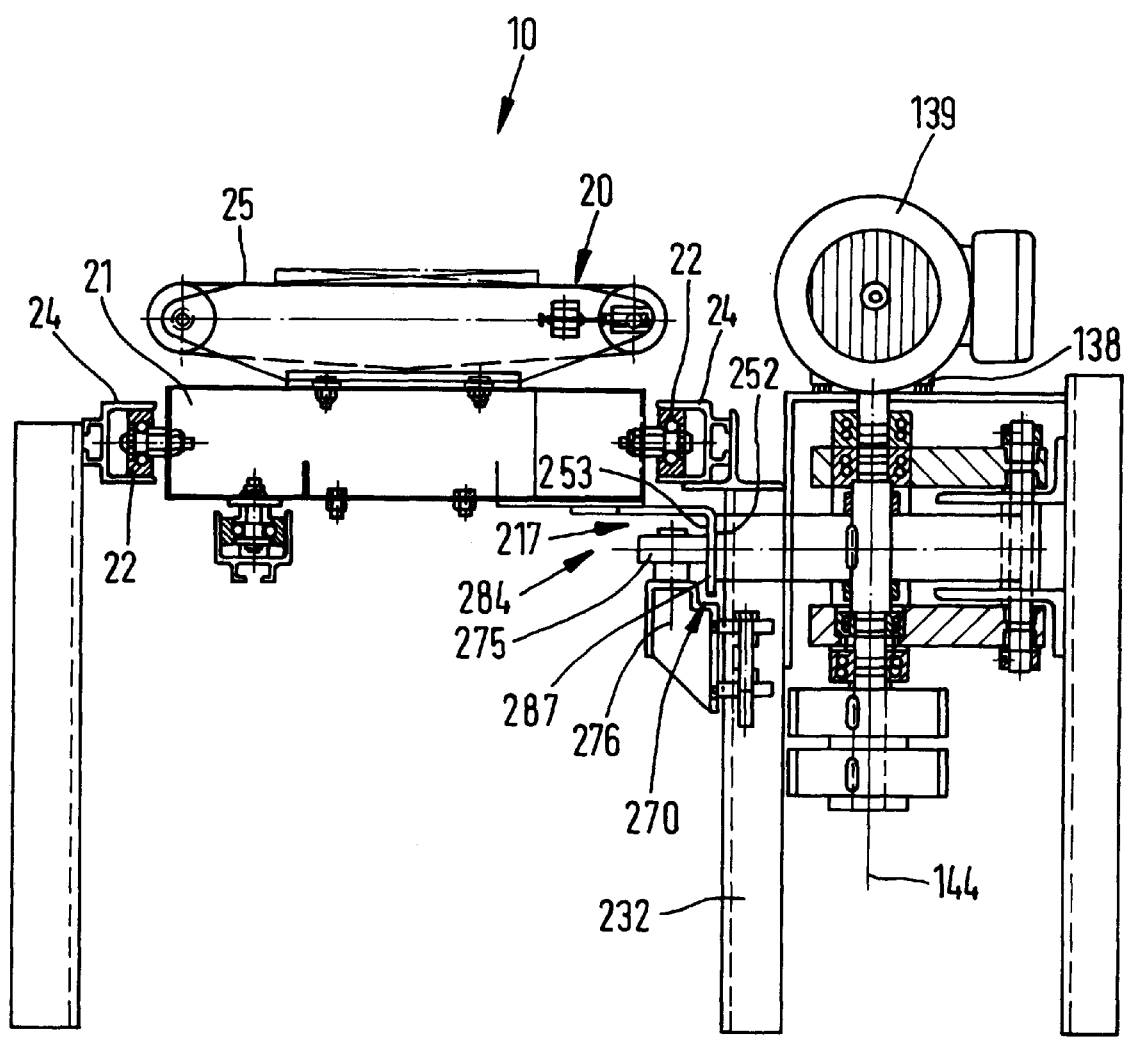
FIG. 12 shows a cross section similar to FIG. 11 through another embodiment of a device for sorting piece goods, where the friction surface drive engages the chain links on the sides.

As shown in FIG. 12, the invention here is designed so that the contact pressure-applying peripheries 146, 147, and 148 of rotating elements 140, 141, and 142 engage the flexibly interconnected chain links 217 laterally. In this case, the friction strip 270 has an L-section 284 having a horizontal leg and a vertical leg 287, bent at an angle of 90 degrees. The horizontal leg of L-section 284 is secured on the underside of running carriage 21 of sorting device 20. Vertical leg 287 of L-section 284 of friction strip 270 has parallel contact pressure-receiving surfaces 252 and 253. These surfaces extend vertically and in the direction of transport shown by arrow 151 in FIGS. 9 and 10. Vertical contact pressure-receiving surface 252 on the outer side can be engaged by a non-positively and by a frictional grip by contact pressure-applying peripheries 146, 147, and 148 of rotating elements 140, 141, and 142, and contact pressure-receiving surface 253 can be engaged non-positively and by friction grip by counter pressure roller 275.

Counter pressure roller 275 is fixed, so that it is rotatably secured on standing rack 232, revolving about the vertical axis of rotation. In the embodiment of FIG. 12, vertical rotation axle 276 of counter pressure roller 275 and vertical rotation axle 144 also extend parallel to each other and in a vertical plane that is perpendicular to the direction of transport shown by arrow 151, and perpendicular to contact pressure-receiving surfaces 252 and, respectively, 253 of vertical leg 287 of chain link 217. This chain link 217 is designed as a friction strip 270. The arrangement of friction surface drive 118 shown in FIG. 12, is especially useful if the space for accommodating this drive beneath running carriages 21 of the sorting device 20 is not available. It is understood that chain links 117 and 217 are designed as friction strips 170 and 270 that do not necessarily have to be arranged underneath running carriages 21 of sorting devices 20. In this case, these chain links can be arranged also on the side of the running carriages 21.

Accordingly, while a few embodiments of the present invention have been shown and described, it is to be understood that many changes and modifications may be made thereunto without departing from the spirit and scope of the invention as defined in the appended claims.

What is claimed is:

1. A device for sorting piece goods, having a plurality of sorting devices guided along a sorting line and driven by means of a conveyor system, wherein each sorting device has a running carriage with running rollers guided with a series of guide rails of the sorting line and a means for receiving a parceled article from a loading station, the conveyor system comprising:

(a) a chain comprising a series of chain links flexibly connected to each other, wherein said series of chain links each have a flat underside region and wherein at least one of said series of chain links is rigidly connected with an underside of each running carriage of the sorting devices, and wherein said chain projects beyond the running carriage in the direction of conveyance;

(b) a series of pre-tensioned leaf springs, connected to said series of chain links and bridging a series of joints between each of said series of chain links;

(c) a friction wheel engaging the flat underside region of said series of chain links; and (d) a friction wheel drive attached to said friction wheel for driving said driving wheel and said chain.

2. The device according to claim 1, further comprising:

a series of connecting elements; and a series of ball joints connecting each of said series of connecting elements to each of said series of chain links for bridging a series of joints between said series of chain links.

3. The device according to claim 1, wherein said leaf springs are secured on an end surface of each of said series of chain links and wherein said leaf springs flatly abut an underside region of an adjacent chain link, bridging each of said series of joints with initial tension.

4. The device according to claim 1, wherein said friction wheel drive is a proportional drive having a friction wheel wherein a force of contact pressure applied to said series of chain links changes depending on a driving force transmitted to said chain.

5. The device according to claim 1, wherein said friction wheel engages an underside region of said series of chain links in a horizontally extending section of the sorting line.

6. The device according to claim 1, further comprising at least one additional friction wheel drive disposed along the sorting line spaced apart from an adjacent friction wheel drive wherein said at least one additional friction wheel drive has a friction wheel cooperating by friction grip with said series of chain links.

7. The device according to claim 1, wherein said series of chain links each have face ends that are rounded spherically.

8. The device according to claim 1, wherein said series of chain links each contain chamfered sections at their face ends so that said chamfered sections are shaped so that an upwardly pointing recess of a V-shaped gusset is formed between each two flexibly interconnected chain links.

9. The device according to claim 1, wherein said series of chain links each have a top face with substantially semi-circular roundings.

10. A device for sorting piece goods, having a plurality of sorting devices in succession guided along a sorting line and driven by means of a conveyor system, wherein each sorting device has a running carriage with a series of running rollers guided on a series of guide rails of the sorting line, and means for receiving a parceled article in a defined location of an ejection station, the conveyor system comprising:

(a) a chain comprising a series of chain links flexibly interconnected with each other to form said chain, wherein at least one chain link is rigidly connected with each of the running carriages of the sorting devices;

(b) at least one friction surface drive;

(c) a series of rotating elements disposed in said friction surface drive each having a contact pressure-applying periphery;

(d) a series of rotational axles for allowing each of said series of rotating elements to rotate about said axles;

(e) a rigid carrier for supporting said rotating elements;

wherein said series of rotating elements are spaced apart from each other along the direction of the sorting line so that the contact pressure applying periphery of said rotating elements co-operates non-positively with a contact pressure-receiving surface of at least one of said series of chain links.

11. The device according to claim 10, wherein said contact pressure-applying periphery and each of said rotating elements co-operate non-positively with the contact pressure-receiving surface of at least one of said series of chain links.

12. The device according to claim 10, wherein said rotating elements are designed as friction wheels having said contact pressure-applying peripheries that co-operate by frictional grip with said contact pressure-receiving surface of said series of chain links.

13. The device according to claim 10, further comprising a loop drive designed in the form of a belt that loops around at least two of said series of the rotating elements, wherein said loop drive is arranged between said contact pressure-applying periphery of said rotating elements and said contact pressure-receiving surface of said series of chain links, so that said loop drive cooperates non-positively with said contact pressure-applying periphery of said series of rotating elements, and by frictional grip with said contact pressure-receiving surface of said series of chain links.

14. The device according to claim 13, wherein said loop drive loops around at least three of said series of rotating elements spaced apart from each other along the direction of the sorting line.

15. The device according to claim 13, wherein said loop drive cooperates by frictional grip with said contact pressure-applying periphery of said series of rotating elements, wherein said rotating elements are designed in the form of friction wheels.

16. The device according to claim 10, wherein said series of rotating elements are coupled via a driving means, so that said contact pressure-applying peripheries on said series of rotating elements rotate with substantially the same peripheral speed.

17. The device according to claim 16, wherein said driving means is designed as a loop drive in the form of a wedged or toothed belt, said belt being arranged on corresponding belt pulleys revolving around said series of rotational axles, whereby preferably one rotating element and at least one belt pulley are rotatably arranged, revolving around a common rigid rotational axle.

18. The device according to claim 10, wherein the sorting line has a horizontally extending section, and wherein said contact pressure-applying periphery of said series of rotating elements engages said series of flexibly interconnected chain links on their undersides or sides.

19. The device according to claim 10, wherein said series of chain links each have a series of friction strips that are rigidly connected to an underside region of said running carriages of said sorting devices.

20. The device according to claim 19, wherein said friction strips each contain a series of parallel contact pressure-receiving surfaces pointing away from each other, whereby at least one contact pressure-receiving surface cooperates non-positively with said contact pressure-applying periphery of said series of rotating elements, and said remaining contact pressure-receiving surface cooperates non-positively with a counter pressure roller fixed on the device.

21. The device according to claim 10, wherein said series of chain links project in the direction of the sorting line, preferably on both sides of the running carriages of the sorting devices.

22. The device according to claim 10, wherein said carrier of said rotation axles is movable in relation to said contact pressure-receiving surfaces of said at least one chain link.

23. The device according to claim 10, wherein said friction surface drive is a proportional drive with at least one rotating element, wherein a force of contact pressure exerted by said rotating element onto said chain links changes depending on the driving force to be transmitted to said chain.

24. The device according to claim 10, further comprising a series of additional friction surface drives that are arranged along the sorting line spaced apart from each another, wherein each of said series of additional friction surface drives have at least three rotating elements each having a contact pressure-applying periphery and cooperating non-positively with said chain links.

* * * * *